Figure 1:
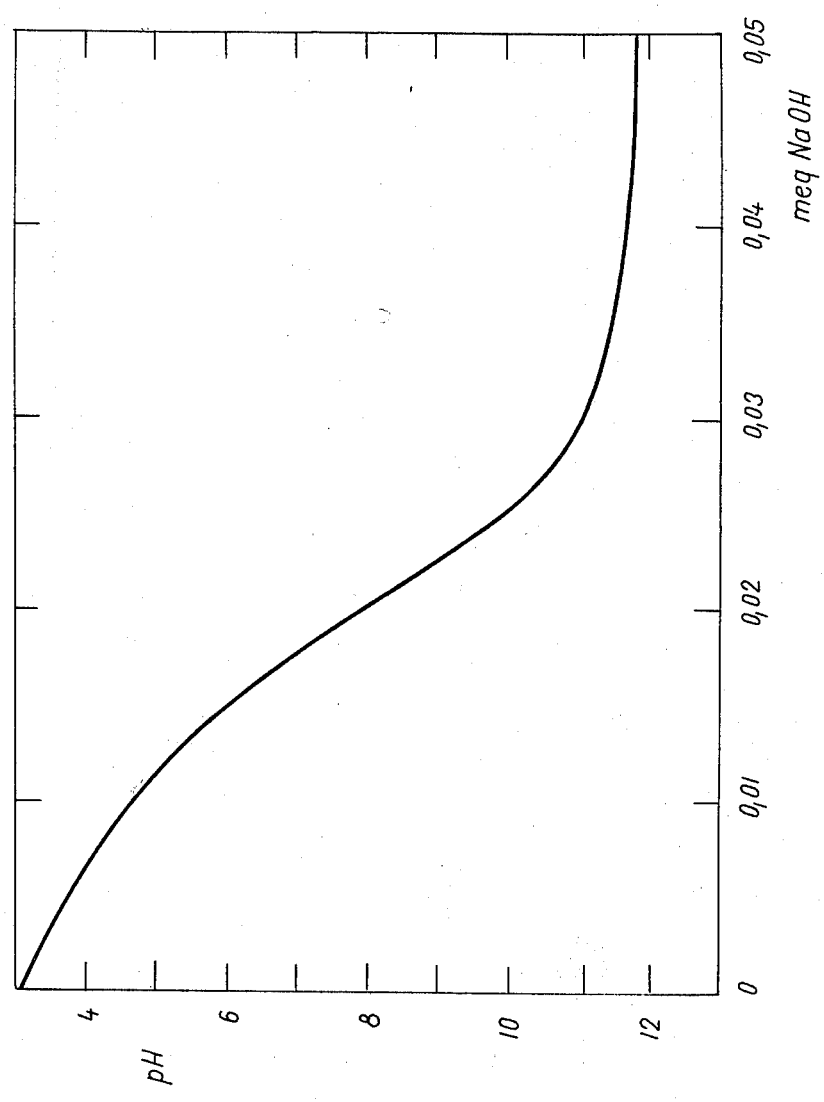

United States Patent [19]

Strop et al.

[11] 3,991,018

[45] Nov. 9, 1976

[54] METHOD FOR PREPARATION OF CATION EXCHANGERS BY SUBSTITUTION OF HYDROPHILIC POLYMERIC GELS OF CROSSLINKED HYDROXYALKYL ACRYLATES AND HYDROXYALKYLACRYLAMIDES

[75] Inventors: Petr Štrop; Otakar Mikeš; Jiří Čoupek, all of Prague, Czechoslovakia

[73] Assignee: Ceskoslovenska akademie ved, Prague, Czechoslovakia

[22] Filed: Jan. 29, 1975

[21] Appl. No.: 545,017

[30] Foreign Application Priority Data

Feb. 1, 1974   Czechoslovakia ................... 704/74

[52] U.S. Cl. .................... 260/2.2 R; 260/2.1 R; 210/24; 210/38 R; 526/14; 526/27; 526/30; 526/49; 526/56
[51] Int. Cl.² ................... C08F 8/10; C08F 8/06; C02B 1/42; C08F 216/02
[58] Field of Search ........... 260/2.1 R, 2.2 R, 80.75; 210/24, 38

[56] References Cited
UNITED STATES PATENTS 3,880,818   4/1975   Shen et al. ....................... 260/80.75
3,931,123   1/1976   Vocik et al. ..................... 260/80.75

*Primary Examiner*—Joseph L. Schofer
*Assistant Examiner*—Peter F. Kulkosky

[57] ABSTRACT

The invention relates to a method for preparation of hydrophilic cation exchangers by a chemical modification of crosslinked copolymeric gels containing reactive hydroxyl groups and based on hydroxyalkyl, oligoglycol or polyglycol acrylates and methacrylates and hydroxyalkylacrylamides or hydroxyalkylmethacrylamides. The modification is carried out in reactions of hydroxyl groups with halogenalkane acids and their derivatives, anhydrides and halides of dicarboxylic acids or carbodiimides. If the modification agent contains several reactive groups, the remaining functional groups after modification may be allowed to react with dicarboxylic, polycarboxylic, hydroxycarboxylic or aminocarboxylic acids, or phosphoric or sulfuric acid, halogenoepoxides, diepoxides or polyepoxides. The hydroxyl groups can be also modified by oxidation to carboxylic groups by common oxidants. The gels used for modification may also contain alkoxide reactive groups and they have generally the homogeneous, semiheterogeneous or macroporous character. The ion-exchanging gels prepared in this way are suitable for sorption and chromatographic separations, especially for separation of sensitive biological materials.

11 Claims, 11 Drawing Figures

METHOD FOR PREPARATION OF CATION EXCHANGERS BY SUBSTITUTION OF HYDROPHILIC POLYMERIC GELS OF CROSSLINKED HYDROXYALKYL ACRYLATES AND HYDROXYALKYLACRYLAMIDES

The invention relates to a method for transformation of non-ionogenous hydrophilic polymer gels into cation exchangers by a suitable chemical substitution of the hydroxyl group.

Macroporous and semimacroporous hydrophilic gels of a methacrylate type proved to have a number of advantages in comparison with the hydrophilic gels based on polydextran, consisting above all in the high chemical resistance of their fundamental polymer matrix and its superior mechanical strength. The gels are noted for the minimum abrasive wear in laboratory and plant handling, absence of swelling and the possible easy control of the pore size distribution during the synthesis. Very valuable features of these gels are also the large inner surface of particles and their ability to stand high pressures at considerably high flow rates in a column without defects. The properties predetermine the use of the gels for substitution transformations into ion exchangers. Similarly as polydextran, cellulose or starch, also the synthetic hydrophilic gels based on hydroxy derivatives of acrylic and methacrylic acid contain a great number of reactive hydroxyl groups able to bind chemically ionogenous functional groups under suitable reaction conditions.

An object of this invention is a method for preparation of cation exchangers by substitution of hydroxyl groups of synthetic hydrophilic acrylate and methacrylate gels, wherein the preparation of the cation exchangers is carried out in reactions in which the hydroxy group of the polymer takes part. A very effective reaction is the reaction of the hydroxyl group with halogenoalkylcarboxylic acid or its salt in an alkaline medium is aqueous solutions or in organic solvents. These reactions were formly used for substitution of cellulose, polydextrans and starch by chloroacetic or chloropropionic acid. However, the reaction with the synthetic gels based on hydroxy acrylates and methacrylates proceeds extraordinarily smoothly and gives high yields. Ion exchangers with bonded carboxylic functional groups are formed by oxidation of a part of —CH₂OH group into carboxylic groups or by the reaction of hydroxyl groups of the gel with dicarboxylic acids or their anhydrides under formation of acid esters.

A bivalent group of phosphoric acid may be bonded to the gel matrix by means of a reaction with phosphoryl trichloride, phosphoric acid or phosphorus pentoxide (Czechoslovak Patent Application No. PV 6008-73, now Czechoslovak Pat. No. 168,268). However, substitution of the hydroxyl group is advantageously carried out by heating with phosphates $NaH_2PO_4$, $Na_2HPO_4$ and $Na_5P_3O_{11}$ in an aqueous medium.

The strongly acidic functional group —SO₃H is introduced into aromatic poly(styrene-co-divinylbenzene) ion exchangers by direct sulfonation. Hydrophilic gels of the polydextran type are usually modified by means of halogenosulfonic acid or its salt or by means of cyclic sulfone

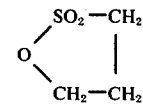

Chlorosulfonic acid or sulfur trioxide react with starch in pyridine or triethylamine giving the sulfo derivative.

An important advantage of hydroxyacrylate and hydroxymethacrylate gels is their high chemical stability under conditions of the modification reaction which allows to use even very drastic reagents without destruction of the fundamental gel skeleton.

The reaction described in examples proved suitable for the preparation of anionic derivatives of hydroxyacrylate and hydroxymethacrylate gels. Cation exchangers of various types are formed in this way, the weakly, medium and strongly acidic functional groups of which are anchored in a homogeneous, semiheterogeneous or macroporous matric by the covalent bond. Advantageous properties of this matrix remain preserved even after the modification reaction. The hydroxymethacrylate gels have higher stability in the hydrolyzing medium in comparison to the stability of the hydroxyacrylate gels. The cation exchangers mentioned in examples were prepared above all for the purpose of sorption and chromatography of biopolymers and their degradation products, however, their application is by no means limited by this fact. The following examples also do not limit in any way the objective of the invention.

EXAMPLE 1

A copolymer of 2-hydroxyethyl methacrylate with ethylene dimethacrylate (5 g), having the molecular weight exclusion limit 100,000, was added to the solution of 15 g of chloroacetic acid in 30 ml of 40% NaOH. The mixture was thoroughly stirred and heated to 90° C. The mixture was heated to this temperature for 13 hours. Then it was cooled and the gel was filtered off, extracted with hot water, washed with 20% HCl, water, 10% HCl, water, methanol, acetone and ether. The gel was dried in air and then in vacuum. The exchange capacity was 1 mequiv/g.

EXAMPLE 2

A copolymer of 2-hydroxyethyl methacrylate with ethylene dimethacrylate (5 g) having the molecular weight exclusion limit 100,000 was swollen in 30 ml of 40% NaOH, cooled to 0° C and a solution of 15 g of sodium chloracetate in 30 ml of distilled water was added. The mixture was allowed to stand for 30 min and then heated to 80° C and kept at this temperature for further 10 hours. The product was filtered off and then washed in the same way as described in Example 1. The exchange capacity was 1.7 mequiv/g.

EXAMPLE 3

A copolymer of 2-hydroxyethyl methacrylate with ethylene dimethacrylate (1 g) having the molecular weight exclusion limit 700,000 was suspended in a solution of 4 g of potassium permanganate and 4 g of sodium carbonate in 40 ml of water.

The mixture was heated to 75° C for 13 hours. The mixture was cooled and the gel was filtered off, washed with water, concentrated nitric acid, concentrated hydrochloric acid, and a mixture of these acids in the ratio 1:10. Then it was washed with water, methanol, acetone and ether and dried in air and in vacuum. The exchange capacity was then determined and IR spectrum recorded.

EXAMPLE 4

A copolymer of diethylene glycol monomethacrylate with ethylene dimethacrylate (2 g) having the molecular weight exclusion limit 100,000 was added to the cooled solution of 5.5 g of chromium trioxide in 7.5 ml of water. The mixture was allowed to stand overnight. The product was filtered off, washed with water, solution of sulfite, water, 5% hydroxide, water, 5% HCl, water, acetone and ether. The oxidation was followed from changes in IR spectrum.

EXAMPLE 5

The same copolymer as in Example 1 (1 g) was added to a mixture of 4 ml of dimethylsulfoxide and 2 ml of acetanhydride. The mixture was stirred and placed in a bath at 75° C. After heating for 16 hours, the product was filtered off, washed with acetone, water, acetone and ether. The product was dried in vacuum and the oxidation was followed from changes in IR spectrum.

EXAMPLE 6

A copolymer of triethylene glycol monomethacrylate with methylenebisacrylamide (1 g) having the molecular weight exclusion limit 150,000 was swollen in 10 ml of porydine. After 30 min. 2 g of maleic anhydride was added to the mixture. The mixture was heated for 10 min to 100° C. The gel was then filtered off, extracted with pyridine, washed with concentrated hydrochloric acid, water, 30% NaOH, methanol, 10% methanolic hydroxide, methanol, water, 10% HCl, water, methanol, acetone and ether. The product was dried in air and then in vacuum. The determined exchange capacity was 1.6 mequiv/g.

EXAMPLE 7

The same copolymer as in Example 1 (1 g) was swollen in 10 ml of pyridine. After 30 min, 2 g of phthalanhydride was added to the solution. The mixture was thoroughly stirred and placed in a bath heated to 90° C. A vessel with the reaction mixture was removed after 15 hours, the mixture was cooled and the gel was filtered off. The product was washed with water, 30% HCl, water, 10% NaOH, water, methanol, 10% methanolic NaOH, methanol, water, again with methanol, acetone and ether. The product was dried in air and then in vacuum. The determined exchange capacity of the product was 1.6 mequiv/g.

EXAMPLE 8

A copolymer of 2-hydroxyethylacrylamide with ethylene diacrylate (1 g) having the molecular weight exclusion limit 100,000 was heated with 2 g of succinic anhydride and 6 ml of triethylamine to 95° C for 6 hours. The product was filtered off, washed with hot water, concentrated hydrochloric acid, water, 30% NaOH (shortly), water, methanol, 10% methanolic hydroxide, methanol, water, again with methanol, acetone and ether. The gel was dried in air and then in vacuum. The capacity of this product was 1.8 mequiv/g.

EXAMPLE 9

The same copolymer as in Example 1 (1 g) was added to 6 ml of cooled chlorosulfonic acid. The mixture was cooled during addition and then allowed to stand for 10 minutes. Dioxan was added to the mixture and the mixture with dioxan was shaken and poured into a great excess of precooled 5% solution of NaOH. The product was washed with water, extracted with dioxan, washed with acetone, pyridine, water, concentrated hydrochloric acid, water and acetone. The determined capacity of the product was 1.7 mequiv/g.

EXAMPLE 10

The same copolymer as in Example 1 (1 g) and 4 g of sodium hydrogen sulfite were mixed with 10 ml of hot water. The mixture after dissolution was placed in a block heated to 230° – 250° C. When the great part of water was evaporated, the mixture was again wetted in the way that water was slowly added to the mixture in such amount that it kept out with evaporation. The heating was carried out for 20 hours and the mixture was then cooled and extracted with hot water. The product was filtered off, washed with distilled water, 10% hydrochloric acid, water, 10% sodium hydroxide, water, 10% hydrochloric acid, water, methanol, acetone and ether. The gel was dried in air and then in vacuum and the content of sulfur was followed by the elemental analysis.

EXAMPLE 11

A copolymer of 2-hydroxypropyl methacrylate with ethylene dimethacrylate (1 g) having the molecular weight exclusion limit 100,000 was swollen in 5 ml of cooled 30% solution of NaOH. The mixture was cooled to 5° – 10° C, the excessive hydroxide was sucked off and 1 g of sodium 2-chloroethylsulfonate in 3 ml of water was added to the solution. The mixture was well stirred, heated to 75° C and 3 ml of 50% NaOH was gradually added to it within 20 min. The mixture was then heated for further 6 hours. The product was washed with water, concentrated hydrochloric acid, water, 20% NaOH solution, water, methanol, water, 10% hydrochloric acid, water, metanol, acetone, and ether. The gel was dried in air and then in vacuum. The content of sulfur in the product was determined by the elemental analysis.

EXAMPLE 12

Sodium hydrogen phosphate (4 g) was dissolved in 20 ml of distilled water. The same copolymer as in Example 1 (1.5 g) was added to this solution. The mixture was stirred and placed in a thermostating block heated to 230° – 250° C. After all water was evaporated, the reaction mixture was continuously wetted with water to be all the time in contact with steam as it was described in Example 10. After 25 hr of heating, the product was extracted with hot water, washed with distilled water, concentrated hydrochloric acid, water, 10% NaOH solution, water, 10% hydrochloric acid, water, methanol and acetone. The gel was dried in air and then in vacuum. The content of phosphorus in the product was determined.

EXAMPLE 13

Sodium alkoxide of a hydroxymethacrylate gel (1 g) having the molecular weight exclusion limit 300,000 (prepared according to the method as described in Czechoslovak Patent Application PV No. 9065-73 of reacting the gel with sodium naphthalene and triphenyl methyl sodium in an aprotic solvent) was allowed to react with 1.5 g of ethyl bromoscetate in 10 ml of dry dioxan at 60° C for 3 hours. On completion of the reaction, the gel was filtered off, repeatedly washed with dioxan and water and subjected to hydrolysis in 0.1 N NaOH (20 ml) at 100° C for 4 hours. The gel was again washed with water, transfered into the H-cycle and its exchange capacity was determined.

EXAMPLE 14

A copolymer of 2-hydroxyethyl methacrylate with ethylene dimethacrylate (2 g) was thoroughly mixed with 10 ml of 50% NaOH solution. The hydroxide was moderately sucked off, 5 ml of epichlorohydrine was added and the mixture was thoroughly stirred and heated to 110° C for 2 hr. The product was washed with acetone, quickly with water, then with acetone and ether and dried in vacuum. By the elemental analysis, 1.2% Cl was found. After heating to 60° C with 20% hydrochloric acid for 1 hr, washing and drying, 3.11% Cl was determined.

EXAMPLE 15

A copolymer of 2-hydroxyethyl methacrylate with ethylene dimethacrylate (1 g), having the molecular weight exclusion limit 100,000 was mixed with 10 ml of dried dioxan, 10 ml of 70% benzene solution of synhydride was added and the mixture was allowed to stand for one-half hr. The suspension was filtered and the gel washed with dioxan and benzene. Butanediepoxide (2 g) which was dried with the molecular sieve Nalsit A4 was added and the mixture was allowed to stand for 3 days. A part of the product was hydrolysed with 2 N HCl, washed with acetone and water and contained 0.73% Cl according to the elemental analysis. The residue was heated to 70° C for 6 hour and contained according to the elemental analysis 2.96% Cl after hydrolysis in 2 N HCl and washing.

EXAMPLE 16

A Grignard reagent was prepared from 10 g of Mg and 24 ml of dried ethyl bromide and then slowly dropwise added to 10 g of a dried copolymer of 2-hydroxyethyl methacrylate with ethylene dimethacrylate, having the molecular weight exclusion limit 100,000, under cooling and without access of moisture. The mixture was stirred for 20 minutes, the gel was then sucked off, several times decanted with dried ether and stored in a desiccator. A part of the sample was suspended in water and titrated with HCl on phenolphthalein. The gel after filtration was dried and weighed. The capacity was 2.4 mequiv or organometal per 1 g.

Dried epichlorohydrine (1.5 ml) was poured into 1 g of the gel after reaction with the Grignard reagent. The mixture was allowed to stand for 30 min, then heated to 100° C for 10 min and rapidly cooled. The gel was filtered off, decanted with acetone, washed with methanol, 0.5 N HCl and water. Then it was kept in 0.5 N HCl for 3 days, washed with water, methanol, acetone and ether and dried. The elemental analysis showed 2.07% Cl.

Another 0.2 g of the gel after the reaction with Grignard reagent was mixed with 0.3 g of dried butanediepoxide and heated to the chosen temperature without access of air. After the required reaction time, the gel was washed with acetone and water, filtered off and covered with the solution of 5 g of NaHSO$_3$ in 10 ml of water. The gel after reaction was thoroughly washed with water, methanol, acetone and ether, dried and analyzed on the content of S and Br.

| Reaction time, hr | Temperature, ° C | Average analytical content, % | |
|---|---|---|---|
| | | Br | S |
| 24 | 25 | 1 | 1.6 |
| 6 | 38 | 1 | 1.9 |
| 4 | 38 | 1.4 | 2.0 |
| 1 | 60 | 1 | 2.3 |
| 3 | 60 | 1.1 | 2.2 |
| 4.5 | 60 | 1.2 | 2.05 |
| 0.5 | 90 | 1.6 | |
| 1 | 90 | 1.3 | 1.8 |
| 3 | 90 | 1.15 | 1.5 |
| 6 | 90 | 1.1 | 1.6 |

EXAMPLE 17

The gel after reaction with Grignard reagent (0.2 g) according to Example 16, was mixed with 0.4 ml of dry epichlorohydrine and heated for the required time without access of moisture. The gel was then washed with acetone, water, ethanol and water and heated with the excess of 20% aqueous NaHSO$_3$ to 60° C for 10 hours. The gel was then thoroughly washed with water, methanol, acetone and ether, dried and subjected to the elemental analysis on the content of S and halogens (e.g., Cl).

| Time, hr. | Temperature, ° C | Content, % | |
|---|---|---|---|
| | | S | N |
| 5 | 38 | 3.12 | 0.56 |
| 5 | 60 | 0.5 | 1.03 |
| 5 | 90 | 0.5 | 3.03 |

EXAMPLE 18

A copolymer of 2-hydroxyethyl methacrylate with ethylene dimethacrylate having the molecular weight exclusion limit 100,000 was swollen in 2 N NaOH, hydroxide solution was moderately sucked off and the gel was mixed with about a twofold volume excess of 30% aqueous NaOH and with the same volume of epichlorohydrine. The mixture was thoroughly stirred, placed in a thermostated bath and, after reaction, cooled. The gel was then washed with water, acetone, water, methanol and water, covered with the excess of 20% aqueous NaHSO$_3$ and heated to 60° C for 10 hours. The gel was thoroughly washed with water, then with methanol, acetone and ether and dried. The content of S and Cl was determined by the elemental analysis.

| Time, hr. | Temperature, ° C | Content, % | |
|---|---|---|---|
| | | S | Cl |
| 5 | 38 | 0.73 | 0.17 |
| 5 | 60 | 0.92 | 0.37 |
| 5 | 90 | 0.84 | 0.59 |

EXAMPLE 19

A flask was charged with 5 g of a copolymer of 2-hydroxyethyl methacrylate with ethylene dimethacrylate, having the molecular weight exclusive limit 100,000. A solution prepared from 5 g of KMnO$_4$ and 5 g of Na$_2$CO$_3$ in 20 ml of hot water was diluted with 20 ml of water and poured into the gel under intense stirring. The mixture was stirred and heated to 78° C for 12 hr. The gel was washed with water, the mixture of HCl and HNO$_3$, water, 0.5 N NaOH, water, 0.5 N HCl, water, acetone and ether. A total exchange capacity 2.5 mequiv/g was determined. FIG. 1 shows the titration curve of the ion exchanger in the H$^+$ form obtained by titration with 0.1 N NaOH. Values of pH are plotted on the axis of ordinates and the consumption of the titrant on the axis of abcissas.

EXAMPLE 20

Figure 2:
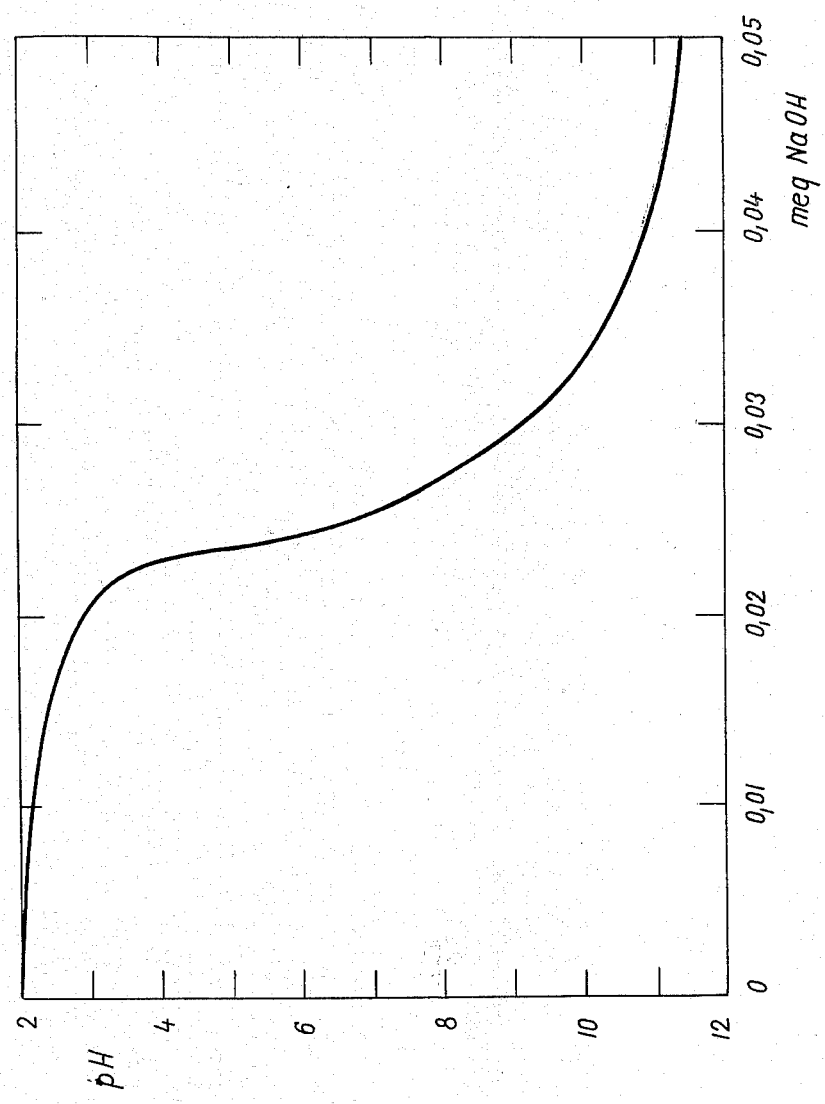

A copolymer of 2-hydroxyethyl methacrylate with ethylene dimethacrylate after reaction with 10% solution of phosgene in benzene at 30° C for 5 hours (4 g) having the molecular weight exclusion limit 300,000 was mixed with 1.2 g of taurine in 10 ml of distilled water. The mixture was rapidly stirred and allowed to stand for 30 minutes. The gel was then washed with water, pyridine, water, methanol, acetone, water, 0.5 N HCl, ethanol and acetone and dried. The sulfur content according to the elemental analysis was 2.2%, N content by the Kjehldal method was 1.02%. FIG. 2 shows the titration curve of the ion exchanger in the H$^+$ form; pH values are plotted on the axis of ordinates and the consumption of titrant (0.1 N NaOH) in miliequivalents on the axis of abcissas.

EXAMPLE 21

Figure 3:
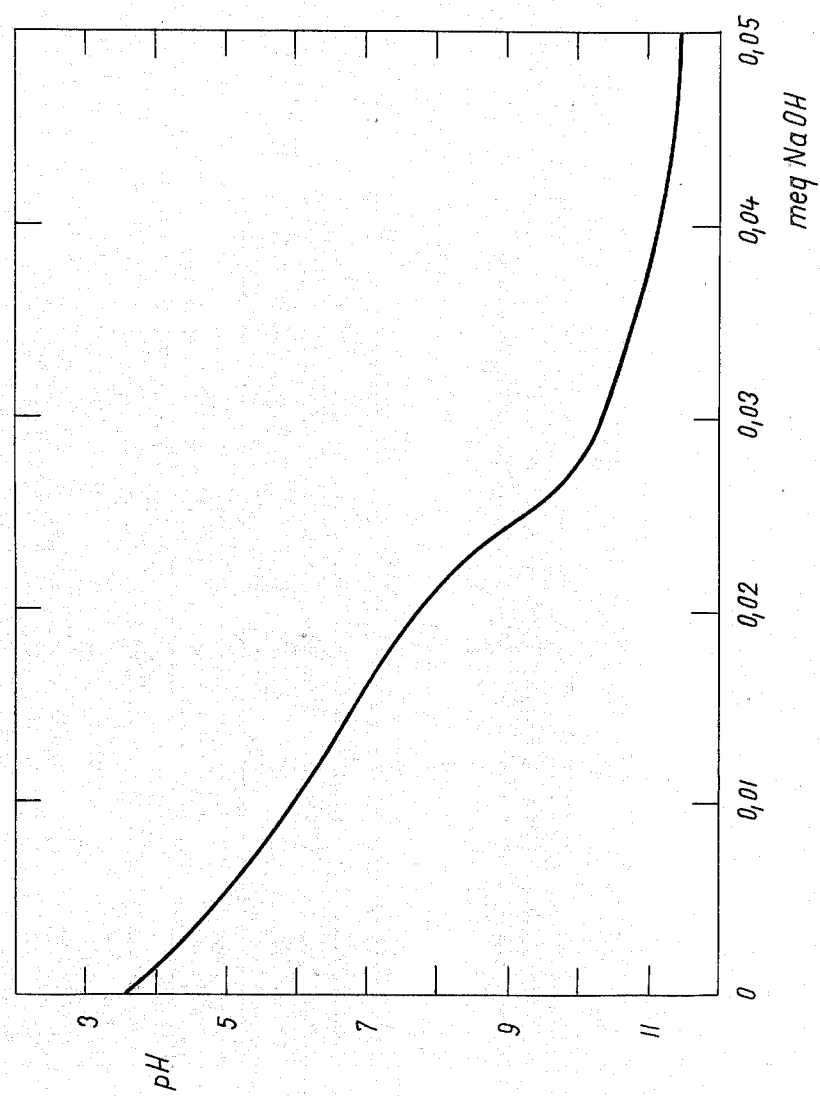

A copolymer of 2-hydroxyethyl methacrylate with ethylene dimethacrylate (1 g), having the molecular weight exclusion limit 100,000, was dispersed in 6 ml of distilled water. The mixture was allowed to stand for 10 minutes and the excessive hydroxide was then sucked off on a tritted-glass filter. The gel was heated with 1 g of iodoacetic acid and 2 ml of water to 80° C for 2 hours, washed with water, 2 N NaOH, water, ethanol, acetone, water, 2 N HCl, water, ethanol, acetone and ether and dried. The total exchange capacity determined was 1.3 mequiv/g. FIG. 3 shows the titration curve of the ion exchanger in the H$^+$ form. Coordinates have the same significance as in Example 20.

EXAMPLE 22

Figure 4:
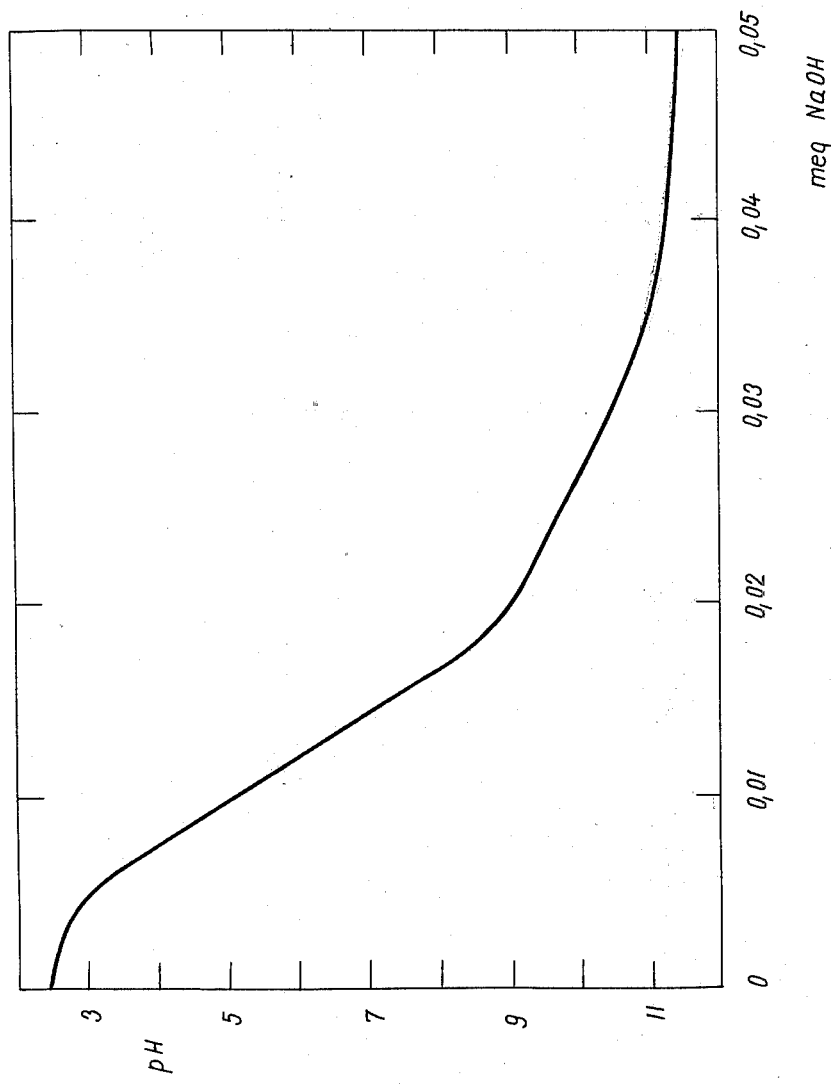

A copolymer of 2-hydroxyethyl methacrylate with ethylene dimethacrylate (5 g), having the molecular weight exclusion limit 100,000, was placed in a three-necked flask, covered with 100 ml of dried acetone and the mixture was stirred and cooled to 5° C. At this temperature and under vigorous stirring, 10 ml of chlorosulfonic acid was dropwise added. The mixture was stirred for 30 min, then 20 ml of pyridine was added and stirred for another 1 hr at 0° C. The product was filtered off and the gel was washed with water, acetone, methanol, water, 2 N HCl, water, ethanol, acetone and ether and dried. According to the elemental analysis, the content of Cl and S was 0 and 1.20%, respectively. FIG. 4 shows the titration curve of the ion exchanger in the H$^+$ form. Coordinates have the same significance as in Example 20.

EXAMPLE 23

A three-necked flask was charged with 20 g of a dried copolymer of 2-hydroxyethyl methacrylate with ethylene dimethacrylate, having the molecular weight exclusion limit 300,000 and the particle size 32 – 40 μm, and 210 ml of ethyl acetate (analytical grade, dried over the molecular sieve Kalcit A3) was added. The mixture was stirred and cooled to −20° C. In 150 ml of ethyl acetate (dried in the same way), 50 g of chlorosulfonic acid was dissolved under cooling. The solution was then cooled to −20° C and gradually added to the gel under stirring and cooling within 17 minutes, so that the temperature was kept at −16° C. The gel was filtered off, washed with ethyl acetate, acetone, ethanol and water, decanted with water, washed with ethanol, acetone and ether and dried. The elemental analysis gave 4.73% S and 0% Cl; the total exchange capacity was 3.1 mequiv per 5 ml of the swollen gel.

EXAMPLE 24

A dried gel of a copolymer of 2-hydroxyethyl methacrylate with ethylene dimethacrylate, having the molecular weight exclusion limit 100,000, was mixed with a moderate excess of butyllithium in tetrahydrofuran. The reaction was carried out under stirring and cooling for 30 min in a nitrogen atmosphere. The gel was then washed with dried tetrahydrofuran. About 0.2 g of this gel was mixed with a moderate volume excess of dried epichlorohydrine (or butadiepoxide) and heated with 0.5 N HCl to 70° C for 6 hr. The content of Cl was then determined (Cl I) after this reaction, the gel was subjected to the reaction with SOCl$_2$ and the Cl content was again determined (Cl II), while Cl I corresponds to the content of epoxides).

| Time, hr | Temperature, °C | Content of Cl, % I | II | Type of epoxide |
|---|---|---|---|---|
| 3 | 25 | 1.04 | 5.71 | epichlorohydrine |
| 5.5 | 70 | 6.92 | 9.55 | epichlorohydrine |
| 3.5 | 25 | 1.41 | 5.95 | butanediepoxide |
| 6.5 | 70 | 4.94 | 7.12 | butanediepoxide |

EXAMPLE 25

A flask was charged with 7 g of the gel, which was transformed into Li alkoxide by the procedure described in Example 24 and 27 g of butanediepoxide was added (dried over the molecular sieve Potasit A3). The flask was heated to 70° C, maintained at this temperature for 3 hours under occasional stirring and without access of moisture and then allowed to stand overnight. The mixture was then heated for 10 min to 100° C under a reflux condenser. The temperature inside the flask reached 130° C and the mixture was kept at this temperature for 5 min. Then it was cooled, washed with acetone, ether, acetone, rapidly with cold water and the large excess of acetone, with ether, CHCl$_3$ and ether and dried in vacuum.

EXAMPLE 26

The gel modified with butanediepoxide according to Example 25 (0.3 g) was mixed with 0.79 g of K$_2$HPO$_4$.3H$_2$O and 1.5 ml of water. The mixture was allowed to stand for 1 hr at the laboratory temperature, then heated to 95° C for 4 hours and eventually allowed to stand at the laboratory temperature for 2 days. The gel was filtered off, washed with water, ethanol and acetone. Found: 1.07% P. In the same way, the gel containing 0.61% P was obtained with NaH$_2$PO$_4$.4H$_2$O.

EXAMPLE 27

The gel modified with butanediepoxide according to Example 25 (0.3 g) was mixed with a solution of 0.4 g of $Na_2SO_3$ in 1 ml of water. The mixture was allowed to stand at the laboratory temperature for 1 hr, then heated to 95° C for 4 hr and allowed to stand at the laboratory temperature for 2 days. The gel was then filtered off, thoroughly washed with water, ethanol, acetone and ether and dried in vacuum. The content of sulfur was determined by the elemental analysis. For treatment with $Na_2SO_3$, 1.59% S was found. The modifications with $Na_2S_2O_5$, $Na_2S_2O_3$, $NaHSO_3$ and $KHSO_3$ were carried out in the same way.

| Sample | $H_2O$, ml | Salt, g | Type | S, % |
|---|---|---|---|---|
| A | 1 | 0.4 | $Na_2SO_3$ | 1.59 |
| B | 1 | 0.56 | $Na_2S_2O_5$ | 1.74 |
| C | 1 | 0.5 | $Na_2S_2O_3$ | 3.37 |
| D | 1 | 0.55 | $NaHSO_3$ | 1.84 |
| E | 0.2 | 0.2 | $Na_2S_2O_3 \cdot 5H_2O$ | 2.61 |
| F | 1 | 0.62 | $KHSO_3$ | 1.5 |

Figure 5:
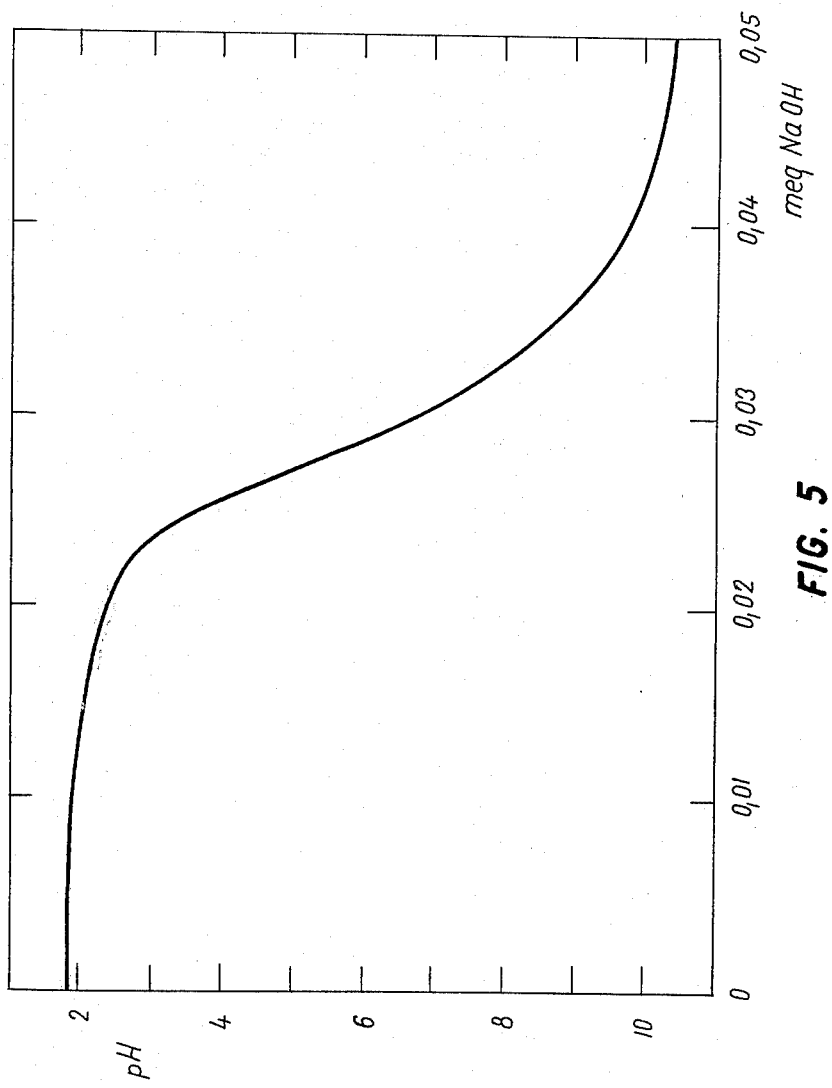
Figure 6:
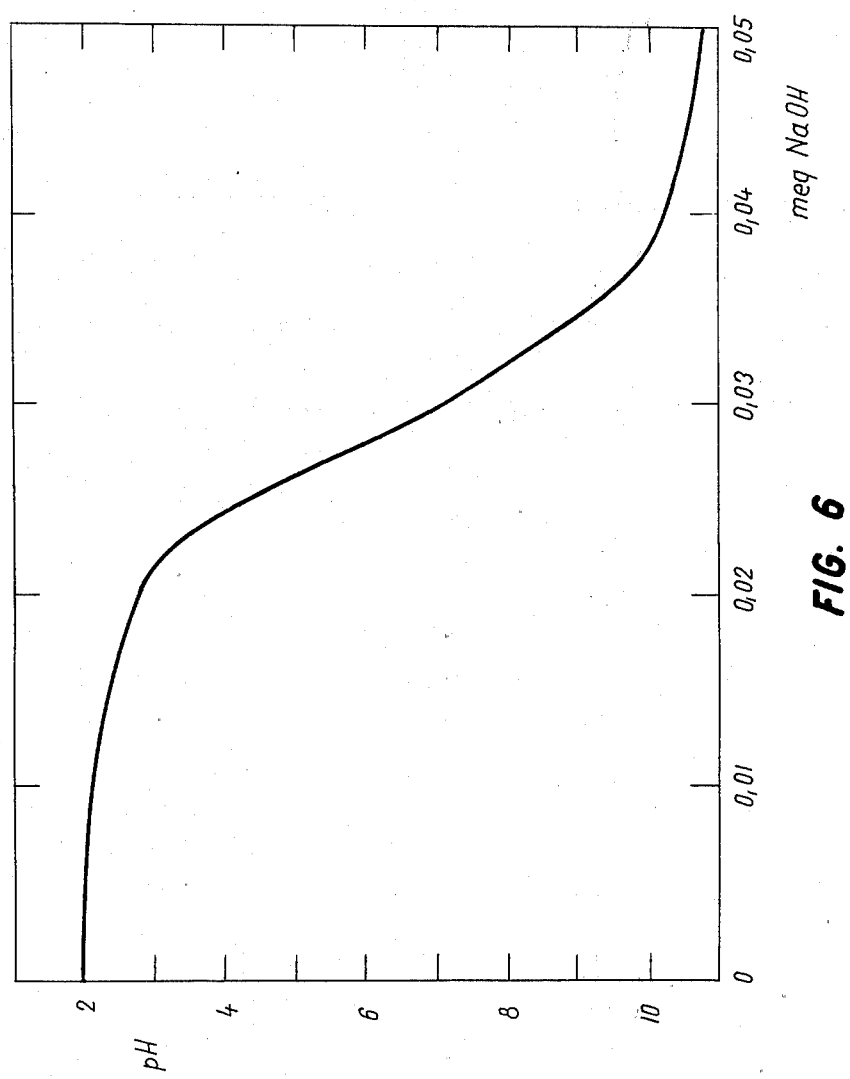
Figure 7:
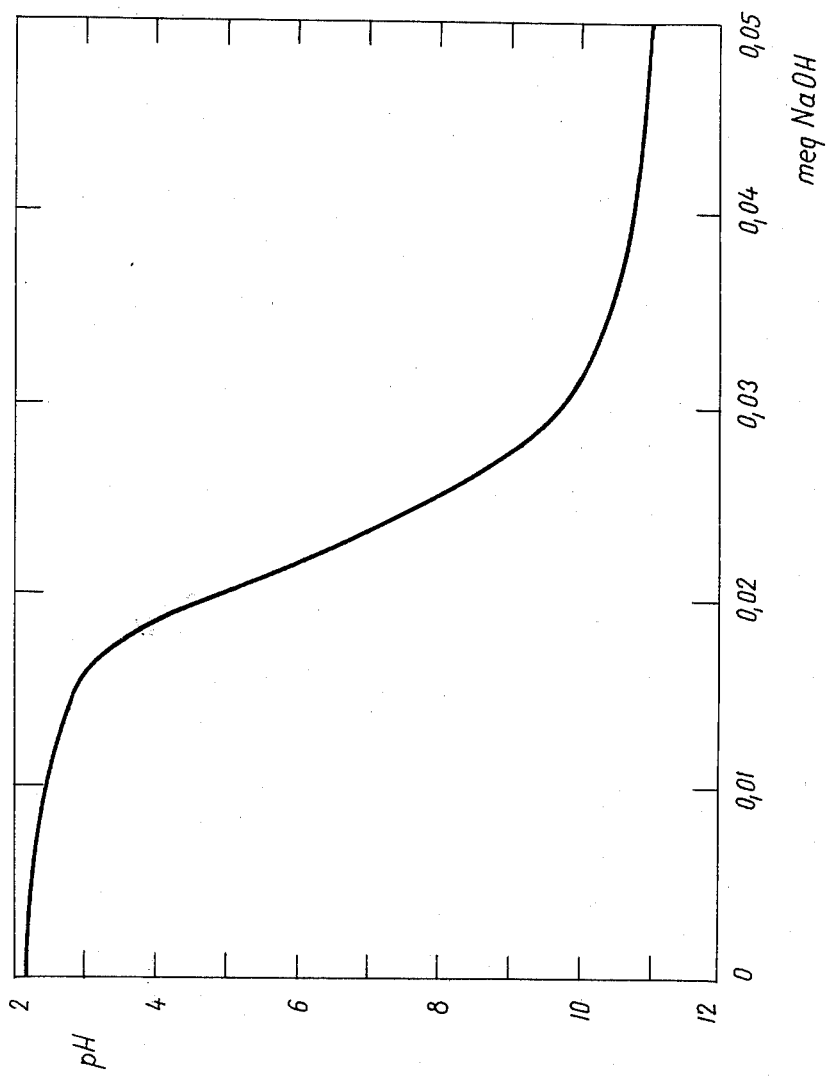

A part of the sample containing 2.61% S was mixed with concentrated $HNO_3$ for 30 min. The gel was washed with water, ethanol and acetone. Found: 1.4% S (G). FIGS. 5, 6 and 7 show the titration curves of gels marked B, D and F in the Table. Coordinates have the same significance as in Example 20.

EXAMPLE 28

A 250 ml flask was charged with 8.3 g of a copolymer of 2-hydroxyethyl methacrylate with ethylene dimethacrylate, having the molecular weight exclusion limit 300,000 and the particle size 20 – 40 μm. The gel was covered with a solution containing 9 g of $KMnO_4$ and 10 g of $NaCO_3$ in 100 ml of water and vigorously stirred without heating for 30 min. The temperature was raised to 72° C during further 30 min and the mixture was stirred for 3.5 hr at this temperature. The gel was allowed to stand with $KMnO_4$ for another 70 hr at the laboratory temperature, then filtered off, washed five times with 100 ml of distilled water, 200 ml of the mixture HCl - $HNO_3$ 1:1, three times with 200 ml of distilled water, 200 ml of the mixture HCl - $HNO_3$ 1:1, three times with 200 ml of distilled water, twice with 200 ml of ethanol, three times with 200 ml of distilled water, twice with 100 ml of 10% NaOH solution, and five times with 100 ml of distilled water. Before titration, the gel was additionally washed with ethanol, acetone and ether and dried in vacuum. The determined total exchange capacity of the ion exchangers was 3.5 mequiv/g and 6.62 mequiv per 5 ml of the gel column.

EXAMPLE 29

Figure 8:
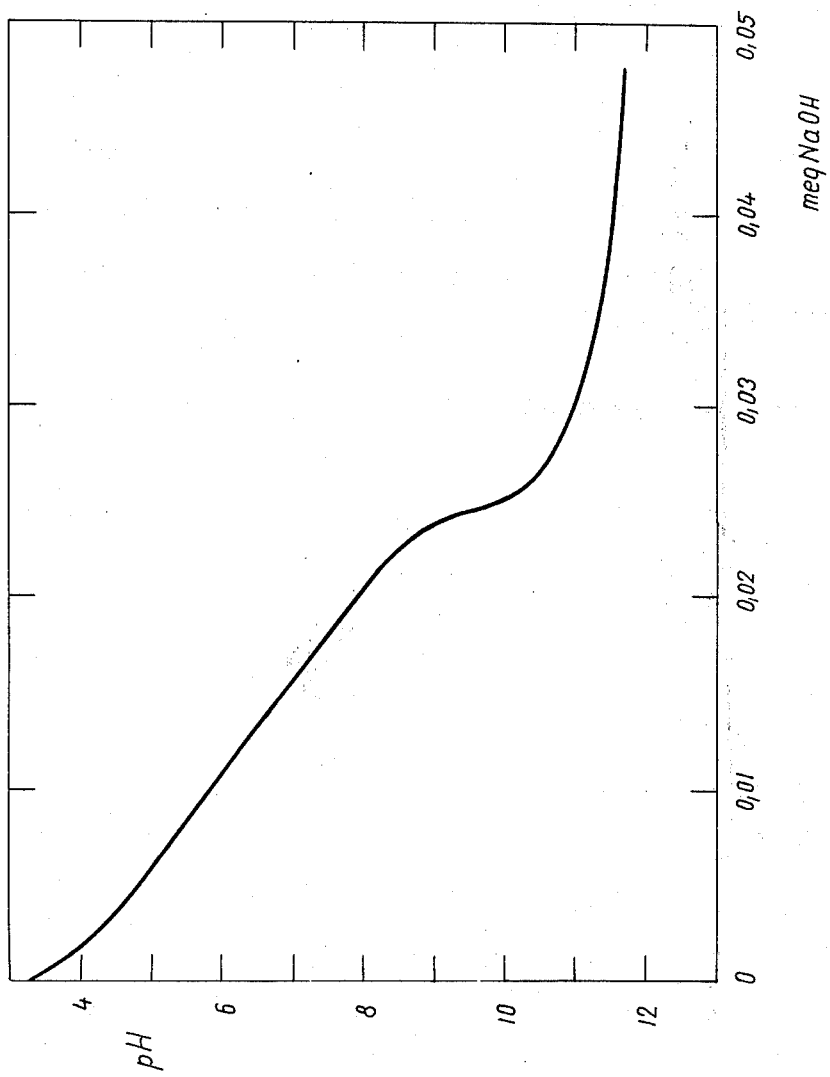

A flask was charged with 8.5 g of a copolymer of 2-hydroxyethyl methacrylate with ethylene dimethacrylate, having the molecular weight exclusion limit 500,000 and the particle size 20 – 40 μm. The gel was mixed with 50 ml of distilled pyridine and 20 g of phthalanhydride was added. The mixture was stirred and heated to 50° C as long as all anhydride dissolved and then it was placed in a thermostated bath at 38° C for 4 days. Then it was additionally heated to 72° C for 14 hours. The gel was washed with 100 ml of acetone, three times with 200 ml of ethanol, twice with 500 ml of distilled water, five times with 100 ml of ethanol, with 100 ml of pyridine, three times with 200 ml of ethanol, twice with 200 ml of acetone, ten times with 100 ml of water, twice with 100 ml of 10% NaOH solution, five times with 300 ml of water, twice with 100 ml of water, twice with 100 ml of 10% NaOH, five times with 300 ml of water, twice with 200 ml of 15% HCl, five times with 300 ml of water, four times with 15% HCl and with water as long as Cl⁻ ions were detected. The sample was then additionally washed with ethanol, acetone and ether and dried and its determined total exchange capacity was 1.7 mequiv/g. FIG. 8 shows the titration curve of the exchanger in the H⁺ form. Coordinates have the same significance as in Example 20.

EXAMPLE 30

A flask equipped with a stirrer, thermometer and a dropping funnel was charged with 2 g of αcopolymer of 2-hydroxyethyl methacrylate with ethylene dimethacrylate, having the molecular weight exclusion limit 100,000 and the particle size 60 – 120 μm, and 30 ml of dried ethyl acetate. The mixture was cooled to −20° C and 4.5 ml of chlorosulfonic acid was dropwise added to it from the dropping funnel within 15 min. The samples were then withdrawn, washed with water, 10% NaOH, water, ethanol, acetone and ether and dried. Then the content of S and Cl was determined.

| Time from the beginning of reaction, min | Temperature °C | Average content, % S | Cl |
|---|---|---|---|
| 15 | −20 | 4.15 | 0.6 |
| 80 | −20 | 3.55 | 0.5 |
| 85 | +4 | 3.5 | 0.5 |
| 140 | +4 | 3.5 | 0.5 |
| 240 | +4 | 3.2 | 0.7 |
| 455 | +4 | 1.8 | 0.5 |
| 1520 | +4 | 1.5 | 0.6 |

EXAMPLE 31

A 250 ml flask was charged with 35 ml of a copolymer of 2-hydroxyethyl methacrylate with ethylene dimethacrylate, having the molecular weight exclusion limit 300,000 and the particle size 20 – 40 μm, and 50 ml of distilled pyridine was added followed by a mixture of 25 g of succinic anhydride with 20 ml of pyridine. The mixture was stirred and heated to 40° C and then allowed to stand for 2 hours with occasional stirring as long as all anhydride dissolved. The mixture was than placed in a thermostated bath at 38° C for 114 hr. The gel was filtered off, washed three times with 100 ml of pyridine to turn white, once with 100 ml of acetone and twice with 100 ml of pyridine. Then, 100 ml of distilled pyridine and 25 g of succinic anhydride were added to the gel, stirred and heated to 73° C for 5 hr. The whole washing procedure was repeated and the gel was again heated with 25 g of anhydride and 100 ml of pyridine to 73° C for 2 hr. Finally, the gel was washed with pyridine, twice with 300 ml of acetone, twice with 200 ml of methanol, twice with 200 ml of ethanol, five times with 200 ml of water, five times with 200 ml of 2 N HCl, ten times with 200 ml of water, three times with 300 ml of 2 N HCl, twenty times with 200 ml of water, three times with 300 ml of ethanol, three times with 300 ml of acetone and twice with 200 ml of ether. The total capacity in a column was determined as 2.2 mequiv/5 ml of the swollen gel.

EXAMPLE 32

An ampoule was charged with 7 ml of concentrated $H_2SO_4$ and 3 ml of 25% oleum and the mixture was cooled to −20° C. At this temperature, 0.3 g of a copolymer of 2-hydroxyethyl methacrylate with ethylene dimethacrylate, having the molecular weight exclusion limit 100,000, was added and the mixture was allowed to stand under occasional stirring at −20° C for 40 minutes. Then it was rapidly poured into a large excess of cooled and stirred water. The gel was filtered off, washed with water, decanted and washed with 2 N NaOH, water, methanol, acetone and ether. After drying, 4.4% S was found.

EXAMPLE 33

An ampoule was charged with 8 ml of concentrated sulfuric acid and 2 ml of 25% oleum. The mixture was cooled to −10° C and 0.3 g if a copolymer of 2-hydroxyethyl methacrylate with ethylene dimethacrylate, having the molecular weight exclusion limit 100,000, was added at this temperature. The mixture was shaken and maintained at −10° C for 10 minutes. The gel was then filtered off and washed with concentrated sulfuric acid, 50% $H_2SO_4$, water, methanol, water, 2 N NaOH, methanol, acetone and ether; 2.6% S was found in the dried sample.

EXAMPLE 34

A copolymer of 2-hydroxyethyl methacrylate with ethylene dimethacrylate, having the molecular weight exclusion limit 100,000, was mixed with a large volume excess (i.e., about 20-fold volume) of sodium hydroxide solution of the given concentration in an ampoule. The mixture was then placed in a thermostated bath at the chosen temperature. After the required period of time, the samples were withdrawn and thoroughly washed with water, ethanol, water, 2 N HCl, water, 2 N NaOH and water. Then they were allowed to stand in 2 N HCl for 1 hr and washed with water as long as Cl⁻ ions were detected in the eluate. The gel washed in this way was further washed with ethanol, acetone and ether and dried in vacuum. The total exchange capacity was determined for each sample (c.f. the table).

Figure 9:
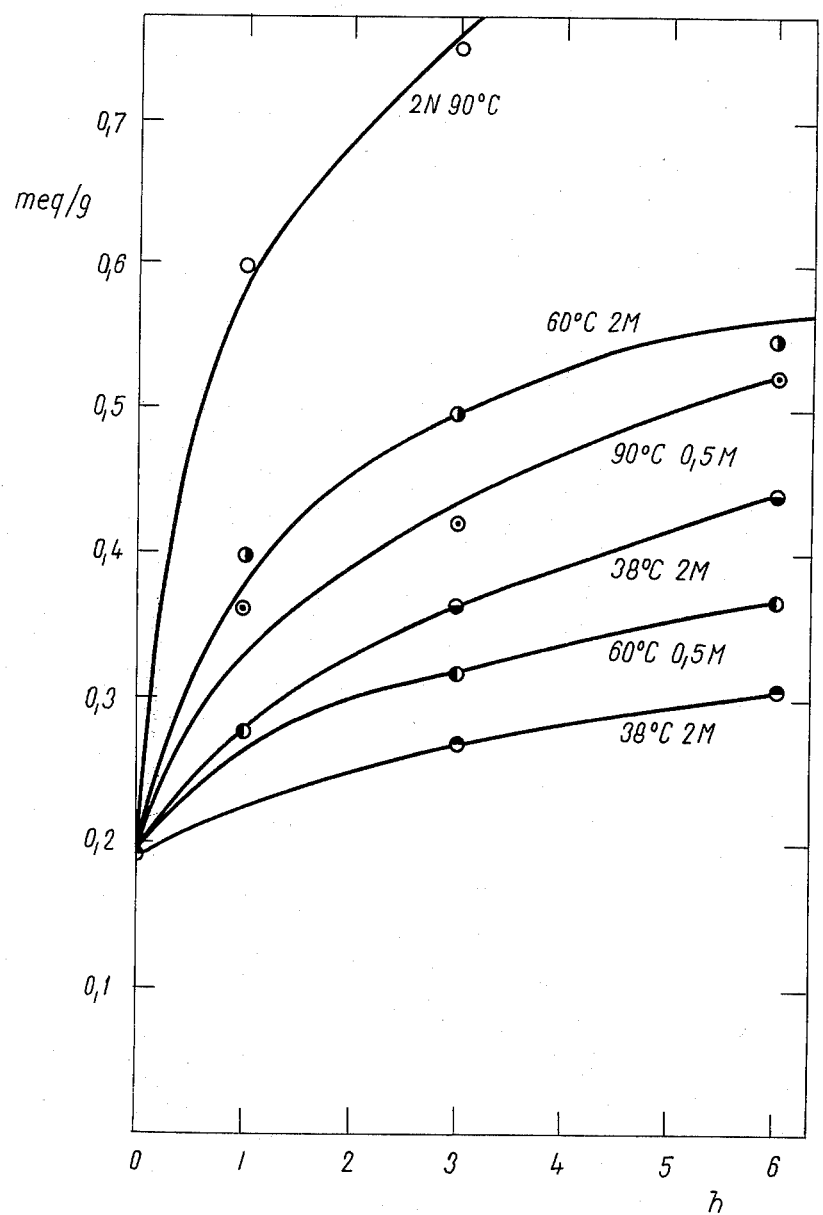

FIG. 9 shows the course of the copolymer hydrolysis in the dependence on time, concentration of NaOH and temperature. The exchange capacity in mequiv/g is plotted on the axis of ordinates, time in hr on the axis of abcissas.

EXAMPLE 35

A solution of 5 g of $NaHSO_3$ and 8 g of epichlorohydrine in 10 ml of water was heated to 75° C for 90 min under stirring with a vibration stirrer. The product was cooled and separated crystals were filtered off, washed with water and acetone and recrystallized from water. The elemental analysis proved a structure Cl —$CH_2$CH(OH)—$SO_3$Na. This product (0.9 g) was mixed with 0.5 g of NaOH, 0.5 g of a copolymer of 2-hydroxyethyl methacrylate with ethylene dimethacrylate, having the molecular weight exclusion limit 100,000, and 3.6 ml of distilled water. The mixture was stirred and heated to 80° C for 10 hr. The washed and dried product contained 0.40% S.

EXAMPLE 36

A conic flask was charged with 5.5 g of $CrO_3$ and 7.5 g of water. On dissolution, 2 g of a copolymer of 2-hydroxyethyl methacrylate with ethylene dimethacrylate was added, having the molecular weight exclusion limit 100,000. The mixture was heated to 40° C, then cooled to 20° C and allowed to stand at the laboratory temperature overnight. The gel was washed with water, ethanol, acetone and ether and dried in vacuum. The exchange capacity was 2.1 mequiv/g.

EXAMPLE 37

A copolymer of 2-hydroxyethyl methacrylate with ethylene dimethacrylate (0.5 g), having the molecular weight exclusion limit 100,000, was added to a solution of 2 g of $CrO_3$ in 3 ml of water cooled to 5° C. The mixture was allowed to stand at the laboratory temperature for 2 days. The gel was then washed with water, ethanol, acetone and ether and dried. The exchange capacity was 1.7 mequiv/g.

For comparison, oxidation of Sephadex was carried out in the similar way: 7 g of $CrO_3$ was dissolved in 20 ml of water and 2 g of Sephadex G-75 was added at the

| Time, min | Temperature, °C | NaOH concn.,M | Capacity, mequiv/g |
|---|---|---|---|
| 0 | initial gel | | 0.19 |
| 180 | 38 | 0.5 | 0.270 |
| 360 | 38 | 0.5 | 0.308 |
| 180 | 38 | 2 | 0.366 |
| 360 | 38 | 2 | 0.445 |
| 210 | 38 | 30% | 1.02 |
| 60 | 60 | 0.5 | 0.277 |
| 180 | 60 | 0.5 | 0.317 |
| 360 | 60 | 0.5 | 0.370 |
| 60 | 60 | 2 | 0.4 |
| 180 | 60 | 2 | 0.5 |
| 360 | 60 | 2 | 0.55 |
| 60 | 60 | 30% | 0.60 |
| 180 | 60 | 30% | 0.765 |
| 360 | 60 | 30% | 1.12 |
| 60 | 90 | 0.5 | 0.364 |
| 180 | 90 | 0.5 | 0.423 |
| 360 | 90 | 0.5 | 0.562 |
| 60 | 90 | 2 | 0.60 |
| 180 | 90 | 2 | 0.750 |
| 360 | 90 | 2 | 1.20 |
| 120 | 90 | 30% | 0.80 |
| 180 | 90 | 30% | 2.16 |
| 360 | 90 | 30% | 5.0 | laboratory temperature. The gel dissolved completely during 2 minutes.

EXAMPLE 38

A solution of 1 g of $CrO_3$ in 15 ml of pyridine was cooled to 5° C and 1 g of a copolymer of 2-hydroxyethyl methacrylate with ethylene dimethacrylate, having the molecular weight exclusion limit 100,000, was added. The mixture was stirred and then allowed to stand at the laboratory temperature for 38 hours. The gel was washed and dried in the same way as in Example 37. The exchange capacity was 1.6 mequiv/g.

EXAMPLE 39

A copolymer of 2-hydroxyethyl methacrylate with ethylene dimethacrylate (0.5 g), having the molecular weight exclusion limit 100,000 was added into a solution of 1 g of $CrO_3$ in 15 ml of pyridine and the mixture was heated to 75° C for 15 hours. The gel was washed and dried in the same way as in Example 37. The exchange capacity was 3.5 mequiv/g.

EXAMPLE 40

A copolymer of 2-hydroxyethyl methacrylate with ethylene dimethacrylate (0.5 g), having the molecular weight exclusion limit 100,000, as added to a solution of 1 g of $CrO_3$ in 5 ml of acetanhydride and heated to 75° C for 15 hours. The gel was then washed and dried in the same way as in Example 37. The exchange capacity was 3.2v mequiv/g.

EXAMPLE 41

A copolymer of 2-hydroxyethyl methacrylate with ethylene dimethacrylate (0.5 g), having the molecular weight exclusion limit 100,000, was added into a mixture of 2 ml of dimethylsulfoxide and 1 ml of acetanhydride. The mixture was sealed in an ampoule and heated to 75° C for 16 hours. The gel was then washed and dried as in Example 37. The exchange capacity was 1.7 mequiv/g.

For comparison, Sephadex G 75 was treated with acetanhydride: 3 g of Sephadex G 75 medium was stirred in 30 g of dimethylsulfoxide and 20 ml of acetanhydride. The mixture was heated to 75° C and the gel completely dissolved during 6 hours.

EXAMPLE 42

A 500 ml three-necked flask was charged with 31 g of a copolymer of 2-hydroxyethyl methacrylate with ethylene dimethacrylate, having the molecular weight exclusion limit 300,000, and 300 ml of ethyl acetate (analytical grade, dried over the molecular sieve Kalsit A3) was added. The mixture was stirred and cooled to −20° C and a mixture of 150 ml of ethyl acetate and 30 ml of chlorosulfonic acid (VEB, Apolda, GDR) cooled to −20° C was dropwise added during 12 minutes. During the reaction, the temperature was maintained at −20° to −14° C by cooling and stirring of the mixture. Chlorosulfonic acid was added in two equal portions; after addition of about one-fifth of the volume of the second portion no increase of temperature by the reaction heat was already observed. After addition of $ClSO_3H$ during 12 minutes, the mixture was stirred for further 3 min and then poured on a fritted-glass filter. The separated gel was washed with ethyl acetate, acetone, ethanol and water and then dispersed in 1 l of distilled water and decanted in 500 ml portions of distilled water. A part of the gel was withdrawn, washed on the filter with water, ethanol, water, 2 N HCl, water, ethanol and acetone and used for determination of the exchange capacity. The product was seven times decanted with 500 ml of water, washed on a filter five times with 500 ml of water, three times with 300 ml of ethanol, three times with 300 ml of acetone, five times with 200 ml of water, twice with 300 ml of 2 N NaOH, with water to the neutral reaction, with 8 M urea, 2 M NaCl and 2 N NaOH, twice with 300 ml of 2 M $H_2SO_4$, 2 N HCl, once with 200 ml of 2 N HCl and water as long as the eluate showed $Cl^-$ ions. The product contained 0% Cl and 1.18% S and the exchange capacity was 1.6 mequiv/5 ml.

Figure 10:
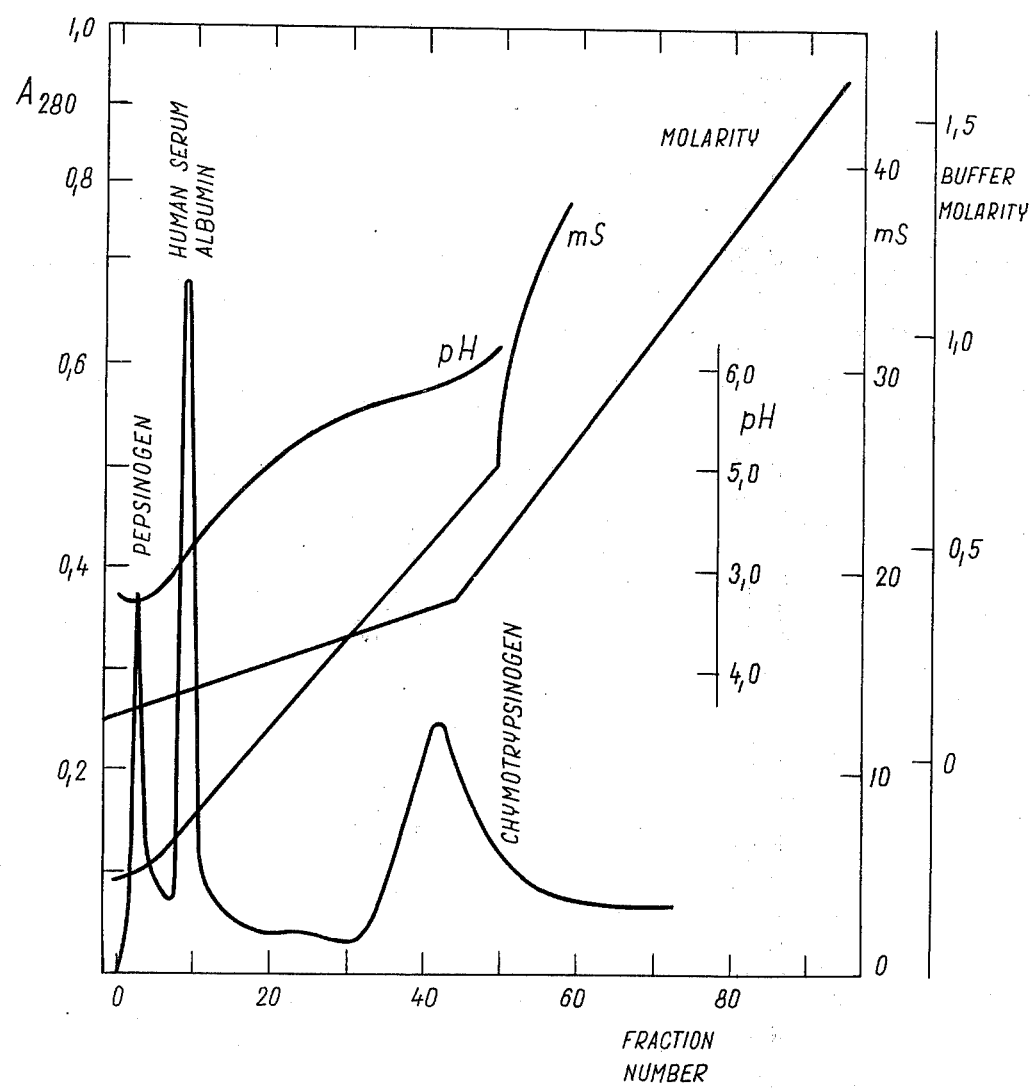

A mixture of proteins containing pepsinogen, human serum albumin and chymotrypsin was chromatographed on this gel (FIG. 10). Elution by means of a two-step linear gradient of the ionic strength and pH. Buffer solutions:
A. 0.05 M $NH_4OH$ — formic acid, pH 3.5
B. 0.3 M $NH_4OH$ — acetic acid, pH 6.0
C. 1 M $NH_4OH$ — acetic acid, pH 8.0 + 0.5 M KCl

EXAMPLE 43

The gel modified with phosgene by a reaction with 10% phosgene solution in benzene at room temperature for 5 hours was poured into water and heated to 50° C for 30 min. The gel was then washed with water, 2 N HCl and water as long as $Cl^-$ ions were present in the eluate. The dried sample had the exchange capacity 1.6 mequiv/g.

EXAMPLE 44

A dry gel of a copolymer of 2-hydroxyethyl methacrylate with ethylene dimethacrylate (5 g), having the molecular weight exclusion limit 100,000, was dispersed in 20 ml of dry tetrahydrofuran. An about five-fold amount of butyllithium, calculated on the number of —OH groups of the gel, in 20 ml of tetrahydrofuran was added to the suspension during stirring and cooling to 0° C. After addition of butyllithium, the mixture was stirred at the room temperature for 0.5 hr. The gel was washed and dried and exhibited the exchange capacity 2.2 mequiv/g.

EXAMPLE 45

Figure 11:
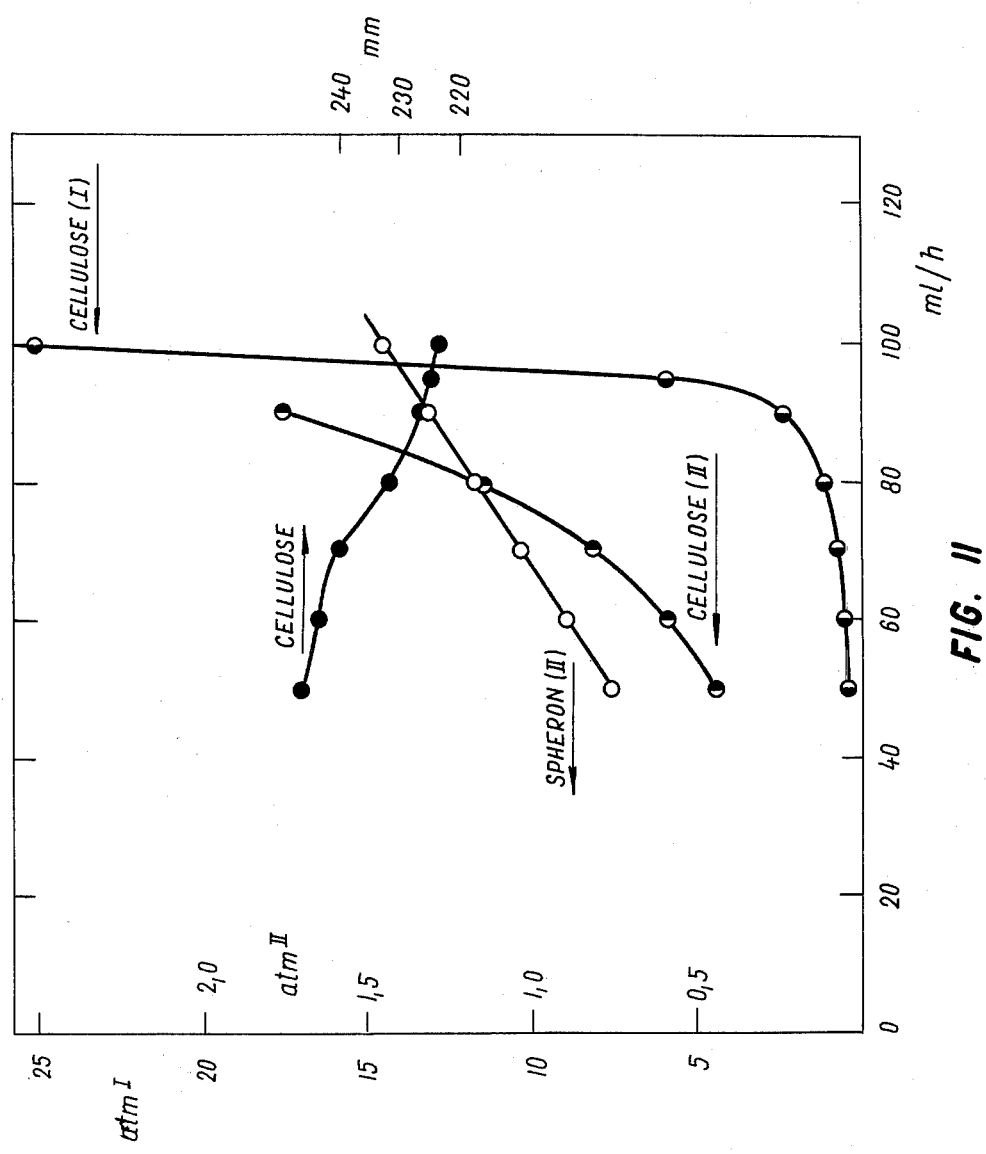

A copolymer of 2-hydroxyethyl methacrylate with ethylene dimethacrylate, having the molecular weight exclusion limit 300,000 and the particle size 10 - 25 μm, was modified according to the Example 36 and packed into a column of a diameter 5 mm and 240 mm long in a buffer solution of 0.03 M $NH_4OH$ — HCOOH (pH 3.5). The through-flow rate was varied and the dependence of the pressure gradient and of the through-flow rate was studied and compared with the phosphorylated cellulose Whatmann Cellulose P70. FIG. 11 shows the plotted dependences of the gradient on the volume through-flow rates.

We claim:
1. Method for preparation of hydrophilic cation exchangers especially suitable for separation of biological materials, wherein crosslinked copolymers of acrylate and methacrylate monomers prepared by a suspension copolymerization of monomers selected from the group comprising hydroxyalkyl methacrylate, hydroxyalkyl acrylate, oligo- and polyglycol methacrylates, oligo- and polyglycol acrylates, hydroxyalkylacrylamides and hydroxyalkylmethacrylamides with crosslinking comonomers containing two or more acryloyl or methacryloyl groups in the molecule selected from the group comprising alkyl di- and polyacrylates, alkyl di- and polymethacrylates, glycol di- and polyacrylates, glycol di- and polymethacrylates and divinylbenzene, and containing reactive hydroxyl groups which comprises modifying the hydroxyl groups of said cross-linked copolymer by reacting the copolymer with a compound capable of reacting with the hydroxyl groups of the copolymer and which contains anionogenic groups which do not take part in the reaction selected from the group consisting of halogeno alkyl dicarboxylic acids, salts thereof, dicarboxylic acid halides and anhydrides, carbodiimides, halogen epoxides, diepoxides, polyepoxides, and oxidizing agents to form the corresponding copolymer containing functional groups capable of providing anions on dissociation thereof.

2. Method according to claim 1 wherein said copolymer is reacted with a compound containing more than one reaction group capable of reacting with the hydroxyl groups and thereafter in a second step the resulting modified copolymer is reacted with a dicarboxylic acid, polycarboxylic acid, hydroxy-carboxylic acid, amino carboxylic acid, phosphoric acid, halogeno epoxide, diepoxide and polyepoxide, whereby the additional functional groups introduced in the first step undergo reaction.

3. Method according to claim 1 wherein any hydroxyl groups remaining in the modified copolymer are subjected to treatment with an oxidation agent whereby said hydroxyl groups are converted into carboxylic groups.

4. Method according to claim 1 which comprises, reacting the copolymer with a metal alkyl to provide the corresponding alkoxide group containing copolymer and thereafter conducting the reaction for modifying the hydroxyl groups with the alkoxide group containing copolymer thereby formed.

5. Method according to claim 1 wherein said copolymer is homogeneous in nature.

6. Method according to claim 1 wherein said copolymer is heterogeneous in nature.

7. Method according to claim 1 wherein said copolymer is macroporous in nature.

8. Method according to claim 1 wherein said reaction is carried out with a halogeno carboxylic acid or its salt in an alkaline medium including a solvent.

9. Method according to claim 8 wherein said reaction is carried out with chloroacetic acid or sodium chloro acetate.

10. A hydrophilic cation exchanger especially adapted for separation of biological materials comprising the modified copolymer of claim 1.

11. Method for carrying out ion exchange which comprises passing a liquid preparation containing material to be ion exchanged in contact with a hydrophilic cation exchanger according to claim 1.

* * * * *